2,827,446
POLYMERIZATION OF ETHYLENE

David S. Breslow, Wilmington, Del., assignor to Hercules Powder Company, Wilmington, Del., a corporation of Delaware No Drawing. Application September 27, 1955
Serial No. 537,039

14 Claims. (Cl. 260—94.9)

This invention relates to an improved process for polymerizing ethylene whereby it is possible to carry out the polymerization at atmospheric or only slightly elevated pressures and at relatively low temperatures and obtain a polyethylene having very desirable and unusual properties, and to the catalyst used for the polymerization.

In Belgian Patents Nos. 533,362, 534,792 and 534,888 of K. Ziegler et al., there is described a new process of polymerizing ethylene to a high molecular weight polyethylene under relatively mild conditions of temperature and pressure by using as the catalyst for the polymerization a mixture of a compound of a metal of groups IV–B, V–B, VI–B or VIII of the periodic table, or manganese, in combination with an organometallic compound of an alkali metal, alkaline earth metal, zinc, earth metal (especially aluminum), or rare earth metal. The process is usually carried out by mixing the two catalyst components in a hydrocarbon diluent and then passing the ethylene into the catalyst mixture at atmospheric or slightly elevated pressure and at room temperature or moderately elevated temperatures. This process is so effective that ethylene is rapidly polymerized to a polymer of very high molecular weight, frequently within the range of 300,000 to 3,000,000 or higher, and careful control of the process is required to obtain polymers in the lower molecular weight range that are suitable for plastic molding.

Now, in accordance with this invention it has been found that an entirely different type of titanium compound, namely, a bis(cyclopentadienyl)titanium salt such as bis(cyclopentadienyl)titanium dichloride, may be used to produce a catalyst which gives outstanding results in the polymerization of ethylene. These bis(cyclopentadienyl)titanium salts are true organometallic compounds having a carbon to metal bond and have been found to be unique in that they, unlike other organometallic compounds of the transition metals, may be used in combination with a metal alkyl compound of a metal of groups I–A, II–A, II–B and III–A of the periodic table to produce a new catalyst for the polymerization of ethylene. The polymers produced by the new catalyst in the polymerization process of this invention are believed to be more linear and to have other desirable properties such as a molecular weight suitable for plastic molding, etc.

As will be apparent from the following discussion, the use of a bis(cyclopentadienyl)titanium salt in combination with a metal alkyl compound of an alkali metal, alkaline earth metal, zinc, or earth metal, etc., has many advantages over the use of other titanium compounds in the polymerization of ethylene. Usually, the reaction product of these titanium compounds with the metal alkyl reducing compound is soluble in the hydrocarbon diluents used for the polymerization process and such soluble catalysts are preferred. With the latter, lower amounts of the catalyst are required for the polymerization, making the process a more economical one, and the catalyst being soluble in the reaction medium, it is more easily removed from the product.

In the polymerization of ethylene using as the catalyst an organometallic compound in combination with a transition metal compound in accordance with the Ziegler applications mentioned above, the molecular weight of the polymer varies with the ratio of organometallic compound to transition metal compound. Hence, for a lower molecular weight polyethylene a low ratio of organometallic to transition metal compound is used. Since the organometallic compounds are sensitive to impurities, only a very small amount of an impurity will then very greatly alter the ratio when a low ratio of organometallic compound to transition metal compound is used. As a result it is usually preferable to operate at a higher ratio of organometallic compound to transition metal compound, but in doing so a higher molecular weight product is then obtained. By using the catalyst composition of this invention, the molecular weight of the polymer produced does not vary appreciably with the ratio of organometallic reducing compound to the titanium compound, particularly if this ratio is 1 or above. Thus, impurities in the system do not have as large an effect in the process of this invention as in the foregoing processes.

The polymerization of ethylene in accordance with this invention is carried out by mixing the bis(cyclopentadienyl)titanium salt with one of the metal alkyl reducing compounds, usually in an inert organic diluent, and contacting ethylene with the reaction mixture. Any bis(cyclopentadienyl)titanium salt may be used as the titanium component of the catalyst mixture. Thus, the anion may be that of an inorganic acid, an organic acid, an alkoxide group, etc. Exemplary of such anions are sulfate, fluoride, chloride, bromide, iodide, nitrate, phosphate, acetate, propionate, methoxide, ethoxide, butoxide, isobutoxide, etc. Of particular value are the bis(cyclopentadienyl)titanium halides. While the tetravalent salts are generally more available and hence more usually used, the trivalent bis(cyclopentadienyl)titanium salts may also be used as, for example, bis(cyclopentadienyl)titanium monochloride, etc. The cyclopentadienyl moiety may be an alkyl-substituted cyclopentadienyl radical containing from 1 to 2 alkyl substituents. The alkyl groups may be alike or different and preferably will be alkyl groups containing from 1 to 8 carbon atoms. Thus, the cyclopentadienyl moiety of such bis(cyclopentadienyl)titanium salts may be an alkyl-substituted cyclopentadienyl radical such as methylcyclopentadienyl, dimethylcyclopentadienyl, ethylcyclopentadienyl, propylcyclopentadienyl, methylethylcyclopentadienyl, etc. The preparation of typical examples of these bis(cyclopentadienyl)titanium salts is described by Wilkinson et al. in J. Am. Chem. Soc., 75, 1011 (1953) and 76, 4281 (1954) and by Birmingham et al. in J. Am. Chem. Soc., 76, 4179 (1954).

The metal alkyl reducing compound that is reacted with the titanium compound may be any alkyl compound of a metal of groups I–A, II–A, II–B and III–A having an atomic number no higher than 56, which metals include Li, Na, K, Rb, Cs, Be, Mg, Ca, Sr, Ba, Zn, Cd, Al, Ga and In. Exemplary of these metal alkyl compounds are the alkali metal alkyls such as butyllithium, amylsodium, etc., dimethylmagnesium, diethylmagnesium, diethylzinc, butylmagnesium chloride, butylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesqui-chloride, dipropylaluminum fluoride, diisobutylaluminum fluoride, diethylaluminum hydride, ethylaluminum dihydride, diisobutylaluminum hydride, etc., and complexes of such organometallic compounds as, for example, sodium aluminum tetraethyl, lithium aluminum tetraoctyl, etc.

When the bis(cyclopentadienyl)titanium compound and the metal alkyl reducing compound are mixed, a reaction takes place which is believed to be a reduction of the titanium compound from the tetravalent state of the titanium to the trivalent or divalent state or mixtures of these states. The exact composition of this reaction product is not known but is believed to be, at least in the case where an alkylaluminum compound is used as the reducing agent, a complex of a reduced form of the titanium compound with the aluminum compound or modification thereof. As has already been mentioned, the molar ratio of the metal alkyl compound to the titanium compound may be varied over a wide range, but there should be used an amount of the metal alkyl that will produce the desired amount of reduction of the titanium compound. Thus, larger ratios of metal alkyl compound to the titanium compound are required for alkali metal alkyls than in the case of di- or tri-alkylaluminum compounds. In general, the molar ratio of the metal alkyl compound to the titanium compound will be from about 0.1:1 to 100:1 and more usually will be from about 1:1 to 10:1.

The reaction between the titanium compound and the metal alkyl compound is readily carried out by mixing the two compounds in any inert diluent, as for example, aliphatic hydrocarbons such as hexane, heptane, isooctane, etc., cycloaliphatic hydrocarbons such as cyclohexane, or aromatic hydrocarbons such as benzene, toluene, xylene, etc., halogenated aromatic hydrocarbons such as chlorobenzenes, chloronaphthalenes, etc., or any mixtures of such inert diluents. In those cases where the bis(cyclopentadienyl)titanium compound is insoluble in the diluent, the reaction with the metal alkyl reducing compound still takes place very readily since the reaction product is generally soluble in the diluent. For example, bis(cyclopentadienyl)titanium dichloride is insoluble in aliphatic hydrocarbons, but readily reacts with a dialkylaluminum halide to form first a green solution and finally a blue solution. In carrying out the reaction between the two compounds, any concentration of the two reagents may be used that is convenient and the reaction may be carried out at any temperature, the latter generally being determined by the solvent being used, the activity of the reducing agent, etc. Usually the reaction is conveniently carried out at room temperature or at slightly elevated temperatures, but a temperature of from about −50° C. to about 150° C. could be used. The catalyst solution so obtained may be used immediately or it may be conveniently stored and used as desired. An alternate method of carrying out the reaction between the titanium compound and the metal alkyl reducing compound for the polymerization process is to add the olefin to a solution or mixture of the bis(cyclopentadienyl)titanium compound and then add the metal alkyl reducing compound as needed for the polymerization.

The polymerization process may be carried out in a wide variety of ways as, for example, either as a batch or continuous operation. As already pointed out the catalyst combination may be preformed or it may be formed in situ. In some instances it is desirable to prepare the catalyst solution as described above and then use it in connection with an additional organometallic reducing compound. The latter may be the same organometallic reducing compound as used in preparing the catalyst solution or it may be a different one. For example, bis(cyclopentadienyl)titanium dichloride could be reacted with a trialkylaluminum and then either during or just prior to the actual polymerization process, an alkylaluminum compound such as ethylaluminum dichloride or diethylaluminum chloride could be added. Obviously many other variations in the process may be made. The selection of the temperature and pressure used for the polymerization process will depend upon many factors such as the degree of polymerization desired, etc. In general, the polymerization will be carried out at room temperature or slightly above, but any temperature within the range of from about −50° C. to about 150° C. and preferably from about −10° C. to about 100° C. may be used. In the same way, while atmospheric pressure or a pressure of only a few pounds may be used, the polymerization may be carried out over a wide range of pressures as, for example, from a partial vacuum to about 1000 lb. and preferably from about atmospheric to about 500 lb. pressure. Higher pressures may, of course, be used, but generally do not appreciably alter the course of the polymerization.

As has already been pointed out above, it is believed that the polymerization catalyst is formed during the reaction of the bis(cyclopentadienyl)titanium salt with the alkyl metallic compound. Thus, when an in situ catalyst is used, i. e., is formed while the polymerization reaction is going on, no cocatalyst is required for a rapid polymerization. However, when this reaction is completed (during which process the titanium is probably reduced to a lower valence state), a cocatalyst, which is generally oxygen, greatly accelerates the rate of polymerization. The reason for this is believed to be that the oxygen oxidizes the titanium to a higher valence, so that it is available for reaction with the alkyl metallic compound. Hence, it may be a redox (or oxidation-reduction) system in which the oxygen supplies a small but steady concentration of active catalyst. Under usual polymerization conditions there is enough oxygen in the reaction medium or in the ethylene used to cause polymerization to take place, but it is frequently advantageous to deliberately add a quantity of oxygen to the ethylene stream. Excellent results are obtained, especially in a flow system, when ethylene containing oxygen is passed into a solution of catalyst and the alkyl metallic compound is added continuously during the polymerization. This process leads to a product with a high bulk density, thus making it possible to prepare larger amounts of polymer in a given volume of solvent. The oxygen content of the ethylene can be varied from about 0.001 mole percent to as much as about 5 mole percent, but the preferred range is from about 0.01 mole percent to about 0.5 mole percent.

The following examples will illustrate the process of polymerizing ethylene in accordance with this invention and some of the many variations that can be made in this process. As will be seen from these examples, it is possible to select the proper conditions to prepare a polymer of any desired molecular weight by means of the process of this invention. The molecular weight of the polymers produced in these examples is shown by the reduced specific viscosity (RSV) given for each. By the term "reduced specific viscosity" is meant the $\eta sp/C$ determined on an 0.1% solution of the polymer in decalin, containing 0.1 g. of the polymer per 100 ml. of solution, at 135° C. Where the melting point of the polymer is given, it is the temperature at which the birefringence due to crystallinity disappears. All parts and percentages are by weight unless otherwise indicated.

EXAMPLE 1

A polymerization vessel was charged with 0.25 part of bis(cyclopentadienyl)titanium dichloride and 175 parts of anhydrous toluene. After alternate evacuation and filling with nitrogen, the vessel was then charged with 0.265 part of diethylaluminum chloride in 3 parts of n-heptane (an aluminum compound to titanium compound ratio of 4:1). The solution was agitated at room temperature under nitrogen for 1 hour whereby a green solution was obtained. The vessel was then cooled to 0°±1° C. and ethylene was passed in at such a rate that there was a slight excess of gas unabsorbed. At the end of 2 hours the polyethylene which had separated was separated by filtration and washed first with toluene and then methanol. The polymer was then refluxed for 15 minutes with a 10% solution of hydrochloric acid in methanol, washed with methanol and then dried in a vacuum oven at 80° C. for 4 hours. The polymer so obtained amounted to 26.9 parts, had an RSV of 3.4, and a melting point of 138° C. Films prepared from this polyethylene were found to be outstandingly stable when tested in a Fadeometer.

EXAMPLES 2 AND 3

In these examples a series of polymerizations was carried out using a preformed catalyst prepared by mixing bis(cyclopentadienyl)titanium dichloride with diethylaluminum chloride in varying molar ratios of the organometallic compound to the titanium compound, the series of Example 2 being carried out in toluene as the solvent and the series in Example 3 with n-heptane as the solvent. The preformed catalyst was prepared by mixing the two compounds in a small amount of the specified solvent, the reaction being carried out in a nitrogen atmosphere and the color of the solution changing from red through green to a clear blue solution on standing. Each of the polymerization vessels was charged with the specified solvent (the total amount in the reaction being about 35 parts) and after replacing the air with nitrogen, the vessel was evacuated and 2 parts of ethylene was added. After equilibrating at 30° C., the preformed catalyst solution was injected. When the polymerization was complete, as indicated by a drop in the pressure from an initial pressure of about 50 p. s. i. g. to 0 p. s. i. g. unless otherwise indicated, 4 parts of ethanol was added. The polymer was then separated by filtration and refluxed for 15 minutes with a 10% solution of hydrogen chloride in methanol. It was then separated and washed with methanol and dried in a vacuum oven at 80° C. for 4 hours. The amount of each of the catalyst components, the molar ratio of diethylaluminum chloride to bis(cyclopentadienyl)titanium dichloride, the reaction time and RSV of the polymer obtained in each case are set forth below (by A:T molar ratio is meant the molar ratio of organometallic compound to titanium compound):

| $(C_2H_5)_2AlCl$, parts | $(C_5H_5)_2TiCl_2$ parts | A:T molar ratio | Reaction time, hours | RSV |
|---|---|---|---|---|
| Example 2: | | | | |
| 0.03 | 0.13 | 0.5 | 8 (37 p. s. i.) | 10.6 |
| 0.06 | 0.13 | 1 | 8 (25 p. s. i.) | 4.2 |
| 0.12 | 0.13 | 2 | <0.5 | 1.6 |
| 0.24 | 0.13 | 4 | 0.5 | 1.2 |
| 0.36 | 0.13 | 6 | 1.5 | 1.4 |
| 0.60 | 0.13 | 10 | 1.5 | 1.6 |
| Example 3: | | | | |
| 0.12 | 0.13 | 2 | 5 (1 p. s. i.) | 4.0 |
| 0.24 | 0.13 | 4 | 5 (10 p. s. i.) | 4.0 |
| 0.36 | 0.13 | 6 | 5 (21 p. s. i.) | 3.9 |

Thus, at an A:T molar ratio of above 1, the molecular weight of the product does not vary appreciably with the A:T ratio.

EXAMPLES 4–8

In these examples the catalyst was preformed by mixing bis(cyclopentadienyl)titanium dichloride with diethylaluminum chloride or ethylaluminum dichloride in a small amount of the specified diluent. The catalyst mixtures so formed were, except for Example 8, then used for the polymerization of ethylene by injection into the polymerization vessel containing the ethylene and diluent equilibrated at 30° C. as described in Examples 2 and 3 above. In Example 8 the catalyst was preformed directly in the polymerization vessel by mixing the two metallic compounds in the total amount of diluent (34 parts of n-heptane), agitating for 16 hours, the yellow color of the solution which developed immediately in this case changing to a green solution with a black precipitate, and then after equilibrating at 30° C., adding the ethylene to the system. The alkylaluminum compound, parts of it and of the bis(cyclopentadienyl)titanium dichloride, molar ratio of the two and diluent used for carrying out the polymerization are set forth in Table I below along with the reaction time and RSV of the polymer obtained in each case.

Table I

| Ex. No. | Catalyst formed from— | | | | Diluent | Reaction time, hours | Polymer RSV |
|---|---|---|---|---|---|---|---|
| | Alkylaluminum compound | Parts | Parts $C_{10}H_{10}TiCl_2$ | A:T molar ratio[1] | | | |
| 4 | $Al(C_2H_5)_2Cl$ | 0.12 | 0.06 | 4:1 | Toluene | 0.33 | 1.2 |
| 5 | $Al(C_2H_5)_2Cl$ | 0.12 | 0.06 | 4:1 | Benzene | <0.25 | 1.1 |
| 6 | $Al(C_2H_5)_2Cl$ | 0.12 | 0.06 | 4:1 | Isooctane | 1.25 | 2.1 |
| 7 | $Al(C_2H_5)_2Cl$ | 0.12 | 0.06 | 4:1 | n-Heptane | 1.25 | 2.5 |
| 8 | $Al(C_2H_5)Cl_2$ | 0.123 | 0.125 | 2:1 | do | 6.0 (11 p. s. i. g.) | 2.6 |

[1] Molar ratio of metal alkyl compound to titanium compound.

EXAMPLE 9

A catalyst solution was prepared by adding 0.228 part of triethylaluminum in 1.5 parts of n-heptane to a suspension of 0.25 part of bis(cyclopentadienyl)titanium dichloride in 4 parts of n-heptane. An immediate blue color developed and a clear blue solution was formed after agitating for 16 hours at 30° C.

A polymerization vessel with a nitrogen atmosphere was charged with 40 parts of anhydrous toluene. After equilibrating at 30° C., 2 parts of ethylene was added and ¼ of the above prepared catalyst solution was added. To the clear blue solution there was then injected 0.06 part of ethylaluminum dichloride in 0.5 part of n-heptane. After 18 hours at 30° C. the gage pressure had dropped from an initial pressure of 50 p. s. i. to less than atmospheric. The polymerization was stopped by the addition of 4 parts of ethanol and the polymer was separated and purified as in the foregoing examples. There was obtained by this means 1.75 parts of polyethylene having an RSV of 0.9.

EXAMPLE 10

Example 9 was repeated except that instead of adding ethylaluminum dichloride to the polymerization reaction mixture, there was added 0.018 part of anhydrous hydrogen chloride. At the end of 18 hours the pressure in the polymerization vessel had dropped from about 50 p. s. i. g. to 10 p. s. i. g. On isolating the polymer there was obtained 1.71 parts of polyethylene having an RSV of 10.1.

EXAMPLES 11–20

In these examples the catalyst was formed in situ by combining various bis(cyclopentadienyl)titanium salts with various metal alkyl compounds in the presence of ethylene. In each case the polymerization vessel was charged with 45 parts of toluene or 34 parts of n-heptane in Examples 18–20 and the titanium compound, then alternatively evacuated and filled with nitrogen, again evacuated, 2 parts of ethylene added (an initial pressure of about 60 p. s. i. a.), and the metal alkyl compound then added. At the end of the reaction (carried out at 30° C.) the polymerization was stopped and the polymer isolated as in the foregoing examples. The titanium compound, metal alkyl, amount of each, reaction time, final pressure, percent conversion of ethylene to polymer, and RSV of the polymer produced are set forth for each of these examples in Table II.

*Table II*

| Ex. No. | Catalyst formed from— | | | | | Reaction Time, Hours | Pressure, p. s. i. a. | RSV |
|---|---|---|---|---|---|---|---|---|
| | Titanium compound | Parts | Metal alkyl compound | Parts | A:T molar ratio [1] | | | |
| 11 | $C_{10}H_{10}TiI_2$ | 0.01 | $Al(C_2H_5)_2Cl$ | 0.006 | 2:1 | 0.25 | 3 | 0.40 |
| 12 | $C_{10}H_{10}TiF_2$ | 0.005 | $Al(C_2H_5)_2Cl$ | 0.024 | 8:1 | 144 | 45 | ([2]) |
| 13 | $C_{10}H_{10}Ti(OH)Cl$ | 0.006 | $Al(C_2H_5)_2Cl$ | 0.006 | 2:1 | 24 | 29 | ([2]) |
| 14 | $C_{10}H_{10}TiSO_4$ | 0.007 | $Al(C_2H_5)_2Cl$ | 0.006 | 2:1 | 0.25 | 0 | 1.0 |
| 15 | $C_{10}H_{10}Ti(O-(CH_2)_3CH_3)_2$ | 0.008 | $Al(C_2H_5)_2Cl$ [3] | 0.012 | 4:1 | 20 | 22 | 18.9 |
| 16 | $C_{10}H_{10}Ti(OCOCH_3)_2$ | 0.007 | $Al(C_2H_5)_2Cl$ [3] | 0.072 | 24:1 | 72 | 5 | 2.8 |
| 17 | $C_{10}H_{10}Ti(OCOCH_3)_2$ | 0.007 | $Al(C_2H_5)_3$ [3] | 0.05 | 18:1 | 72 | 25 | 18.4 |
| 18 | $C_{10}H_{10}TiCl_2$ | 0.125 | $n-C_4H_9Li$ | 0.10 | 3:1 | 20 | 42 | ([2]) |
| 19 | $C_{10}H_{10}TiCl_2$ | 0.125 | $n-C_5H_{11}Na$ | 0.14 | 3:1 | 20 | 42 | 22.5 |
| 20 | $C_{10}H_{10}TiCl_2$ | 0.125 | $(C_2H_5)_2Mg$ | 0.12 | 3:1 | 20 | 41 | ([3]) |

[1] Molar ratio of metal alkyl compound to titanium compound.
[2] Too viscous and insoluble in decalin at 135° C. to measure.
[3] Added in increments during the polymerization.

EXAMPLE 21

The catalyst used in this example was prepared by tumbling a solution of 0.62 part of bis(cyclopentadienyl)-titanium dichloride and 0.60 part of diethylaluminum chloride in 22 parts of toluene overnight at 30° C. The resulting blue solution was added to 433 parts of anhydrous toluene and ethylene, containing 0.025% oxygen, was passed into the catalyst solution at a rate slightly faster than that at which it was absorbed, the temperature being held at 15-20° C. After about 1.5 hours there was added over a period of about 4 hours 0.94 part of diethylaluminum chloride as an 0.97 molar solution in heptane. At the end of this time the ethylene flow was stopped and the polymer was removed by filtration and washed several times with toluene. It was then refluxed with about 1000 parts of a 10% methanolic hydrogen chloride solution, again filtered, and finally was washed with methanol until acid-free. The polymer so obtained amounted to 150 parts and was a white solid with an RSV of 3.0. The dry solid had a bulk density of 0.43 g./cc. This polyethylene had a crystalline melting point of 135° C. and an infrared analysis indicated that the methyl content was 0.02%, which facts indicated that it was a highly linear polymer.

EXAMPLE 22

A reaction vessel was charged with 0.62 part of bis-(cyclopentadienyl)titanium dichloride and 435 parts of anhydrous toluene, after which it was evacuated and filled with nitrogen twice to remove any oxygen. Ethylene, containing about 0.003% oxygen was passed into the solution which was vigorously agitated and held at a temperature of 15-20° C. while also slowly adding a solution of an 0.96 molar solution of diethylaluminum chloride in heptane. The ethylene was passed into the vessel at a rate slightly greater than that at which it was absorbed and during 2.5 hours there was added a total of 0.96 part of diethylaluminum chloride. The polymer was separated and purified as described in Example 21. The polyethylene so obtained amounted to 89.4 parts and was a white solid having an RSV of 1.5 and bulk density of 0.36 g./cc. It had a crystalline melting point of 136° C. and a methyl content as shown by infrared analysis of 0.16%.

EXAMPLE 23

A suspension of 0.043 part of bis(cyclopentadienyl)-titanium monochloride in 39 parts of anhydrous toluene was tumbled overnight at 30° C. with 0.007 part of gaseous oxygen. The vessel was then evacuated, pressured to 46 lb. with ethylene, and 0.011 part of diethylaluminum chloride was added as an 0.92 molar solution in heptane. The reaction mixture was agitated at 30° C. for 4 hours and then at 40° C. overnight. The polymer was isolated as in the foregoing examples and had an RSV of 11.2.

EXAMPLE 24

A polymerization vessel was charged with 0.07 part of bis(methylcyclopentadienyl)titanium dichloride and 48 parts of anhydrous toluene. After alternate evacuation and filling with nitrogen, there was added 0.06 part of diethylaluminum chloride and finally 1.6 parts of ethylene. After 30 minutes' polymerization at 30° C., the polymer was isolated as in the foregoing examples. The polyethylene so obtained had an RSV of 1.7.

The foregoing examples demonstrate the superior results that are obtained by polymerizing ethylene by the process of this invention. As may be seen, it is possible to polymerize ethylene and obtain, under widely varying conditions, a polymer having a molecular weight within the range desired for plastic molding. Thus, while a faster polymerization rate is achieved when an aromatic hydrocarbon is used as the diluent than when an aliphatic hydrocarbon is used, the viscosity, and hence the molecular weight, of the polymer is reduced. On the other hand, the polymerization rate may be very drastically speeded up by the addition of a controlled amount of oxygen. The polymer produced by using the catalyst and polymerization process of this invention is more linear and hence has improved properties. In addition, the catalyst, generally being soluble in the reaction medium, is much more readily removed from the polymer and the latter then has greatly improved electrical properties. Many other advantages in utilizing the catalyst and process of this invention will be apparent to those skilled in the art.

What I claim and desire to protect by Letters Patent is:

1. The process of polymerizing ethylene which comprises contacting ethylene with a catalyst formed by mixing a bis(cyclopentadienyl)titanium salt wherein the cyclopentadienyl moiety is selected from the group consisting of cyclopentadienyl and alkylcyclopentadienyl radicals with an alkyl metallic compound of a metal having an atomic number within the range of 3 to 56 and selected from the group consisting of the metals of groups I–A, II–A, II–B and III–A of the periodic table.

2. The process of claim 1 wherein the cyclopentadienyl moiety is the cyclopentadienyl radical.

3. The process of claim 1 wherein the cyclopentadienyl moiety is an alkylcyclopentadienyl radical.

4. The process of claim 2 wherein the bis(cyclopentadienyl)titanium salt is a halide.

5. The process of claim 4 wherein the alkyl metallic compound is an alkylaluminum compound.

6. The process of polymerizing ethylene which comprises contacting ethylene with a catalyst formed by mixing bis(cyclopentadienyl)titanium dichloride with diethylaluminum chloride.

7. The process of polymerizing ethylene which comprises passing ethylene into a mixture of bis(cyclopentadienyl)titanium dichloride and an inert diluent and adding an alkylaluminum compound in increments throughout the polymerization.

8. The process of polymerizing ethylene which comprises passing ethylene into a mixture of bis(cyclopentadienyl)titanium dichloride and an inert diluent in the presence of from about 0.001 mole percent to about 5 mole percent of oxygen based on the ethylene and adding an alkylaluminum compound in increments throughout the polymerization.

9. A polymerization catalyst comprising the product formed by reacting a bis(cyclopentadienyl)titanium salt wherein the cyclopentadienyl moiety is selected from the group consisting of cyclopentadienyl and alkylcyclopentadienyl radicals with an alkyl metallic compound of a metal having an atomic number within the range of 3 to 56 and selected from the group consisting of the metals of groups I-A, II-A, II-B and III-A of the periodic table.

10. A polymerization catalyst comprising the product formed by reacting a bis(cyclopentadienyl)titanium salt with an alkylaluminum compound.

11. A polymerization catalyst comprising the product formed by reacting a bis(cyclopentadienyl)titanium dihalide with an alkylaluminum halide.

12. A polymerization catalyst comprising the product formed by reacting bis(cyclopentadienyl)titanium dichloride with diethylaluminum chloride.

13. The process of claim 5 wherein the alkylaluminum compound is a dialkylaluminum halide.

14. The process of claim 8 wherein the alkylaluminum compound is a dialkylaluminum halide.

References Cited in the file of this patent

UNITED STATES PATENTS

| | | |
|---|---|---|
| 2,388,178 | Peterson | Oct. 30, 1945 |
| 2,396,920 | Larson | Mar. 19, 1946 |
| 2,439,765 | Walker | Apr. 13, 1948 |
| 2,600,654 | Jacobson | June 17, 1952 |
| 2,721,189 | Anderson | Oct. 18, 1955 |

FOREIGN PATENTS

| | | |
|---|---|---|
| 533,362 | Belgium | May 16, 1955 |

U. S. DEPARTMENT OF COMMERCE
PATENT OFFICE

CERTIFICATE OF CORRECTION

Patent No. 2,827,446 March 18, 1958

David S. Breslow

It is hereby certified that error appears in the printed specification of the above numbered patent requiring correction and that the said Letters Patent should read as corrected below.

Column 6, line 70, for "alternatively" read -- alternately --.

Signed and sealed this 6th day of May 1958.

(SEAL)
Attest:

KARL H. AXLINE
Attesting Officer

ROBERT C. WATSON
Commissioner of Patents